(12) United States Patent  (10) Patent No.: US 8,178,235 B2
Cheon et al.  (45) Date of Patent: May 15, 2012

(54) BATTERY WITH CAP PLATE HAVING INCLINED EDGE

(75) Inventors: Sang-Eun Cheon, Suwon-si (KR);
Jae-Kyung Kim, Suwon-si (KR);
Hye-Won Yoon, Suwon-si (KR);
Seok-Yoon Yoo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1095 days.

(21) Appl. No.: 11/411,680

(22) Filed: Apr. 25, 2006

(65) Prior Publication Data
US 2006/0240320 A1 Oct. 26, 2006

(30) Foreign Application Priority Data
Apr. 26, 2005 (KR) .................. 10-2005-0034388

(51) Int. Cl.
*H01M 2/04* (2006.01)
(52) U.S. Cl. .............. 429/163; 429/178; 429/175
(58) Field of Classification Search .............. None
See application file for complete search history.

(56) References Cited

U.S. PATENT DOCUMENTS

| 4,460,663 A * | 7/1984 | Stutzbach et al. | 429/151 |
| 6,554,178 B1 * | 4/2003 | Tsukamoto | 228/122.1 |

FOREIGN PATENT DOCUMENTS

| JP | 58-145058 | 8/1983 |
| JP | 07-183011 | 7/1995 |
| JP | 9-7557 | 1/1997 |
| JP | 09007557 A * | 1/1997 |
| JP | 11-025936 | 1/1999 |
| JP | 11-77347 | 3/1999 |
| JP | 11-260326 | 9/1999 |
| JP | 11260326 A * | 9/1999 |
| JP | 2000-090891 | 3/2000 |
| JP | 2001-155698 | 6/2001 |
| JP | 2003-168405 | 6/2003 |
| JP | 2005-026040 | 1/2005 |
| KR | 1996-0019827 | 6/1996 |

OTHER PUBLICATIONS

Patent Abstracts of Japan for publication No. 58-145058 dated Aug. 29, 1983 in the name of Tomio Unno et al.
Patent Abstracts of Japan for publication No. 11-077347 dated Mar. 23, 1999 in the name of Naotada Okada.
Patent Abstracts of Japan for publication No. 11-260326 dated Sep. 24, 1999 in the name of Shunichi Kimura et al.
Korean Patent Abstracts for publication No. 10-1996-0019827 dated Jun. 17, 1996 in the name of Chang-Ho Kim, et al.
Patent Abstracts of Japan, Publication No. 09-007557, dated Jan. 10, 1997, in the name of Takeshi Saito, et al.

* cited by examiner

*Primary Examiner* — Keith Walker
(74) *Attorney, Agent, or Firm* — Christie, Parker & Hale, LLP

(57) ABSTRACT

A rechargeable battery includes an electrode assembly having a positive electrode, a negative electrode and a separator interposed between the positive electrode and the negative electrode, a case for receiving the electrode assembly, the case having an open end, and a cap plate having an inclined outer edge surface, an outer end of the included outer edge surface being attached to a surface of the open end of the case.

7 Claims, 2 Drawing Sheets

BATTERY WITH CAP PLATE HAVING INCLINED EDGE

CROSS-REFERENCE TO RELATED APPLICATION

This application claims priority to and the benefit of Korean Patent Application No. 10-2005-0034388 filed in the Korean Intellectual Property Office on Apr., 26, 2005, the entire content of which is incorporated herein by reference.

BACKGROUND OF THE INVENTION

1. Field of the Invention

The present invention relates to a rechargeable battery, and more particularly, to a rechargeable battery having an improved welding structure and a method of manufacturing the rechargeable battery

2. Description of the Related Art

Unlike a primary battery, a rechargeable battery may be recharged. Recently, a high output rechargeable battery using non-aqueous electrolyte having a high energy density has been developed. Low capacity rechargeable batteries are used for various portable electronic devices such as phones, laptop computers, and camcorders. High capacity rechargeable batteries formed by connecting a plurality of low capacity rechargeable batteries in series or parallel are used to drive motors, such as those of hybrid electric vehicles.

Depending on their external shape, rechargeable batteries may be classified into different types, for example, prismatic and cylindrical batteries. The rechargeable battery includes an electrode assembly having positive and negative electrodes and a separator interposed between the positive and negative electrodes, a case for receiving the electrode assembly, a cap assembly for sealing the case, and positive and negative terminals extending from the cap assembly and electrically connected to the positive and negative electrodes, respectively.

A cap plate of the cap assembly is attached on the case by welding to maintain an airtightness of the case. The welding may be performed vertically (i.e., essentially perpendicular to the weld joint) when the cap plate is fitted in the case or performed horizontally (i.e., essentially parallel to the weld joint) when the cap plate lays on a top surface of the case.

Tolerance variations may arise during the manufacturing process of the cap plate and the case. As a result, it may be difficult to vertically weld together the cap plate and the case. For example, in order to vertically weld together the cap plate and the case, the cap plate must be precisely fitted to an inner circumference of the case. However, when there are tolerance variations in the cap plate and/or the case, a gap may be created between the inner circumference of the case and the outer circumference of the cap plate. This may cause poor welding. Furthermore, laser beams generated during welding may reach the electrode assembly through the gap, damaging the electrode assembly.

When welding is performed horizontally with the cap plate laying on the top surface of the case, a gap may be also created between the top surface of the case and the cap plate due to the tolerance for error of the case and/or the cap plate. Similarly, the laser beams may be emitted to the electrode assembly through the gap, thereby damaging the electrode assembly. The welding defect between the cap plate and the case deteriorates the service life and performance of the rechargeable battery and may cause the rechargeable battery to be unusable.

SUMMARY OF THE INVENTION

The present invention provides a rechargeable battery having an improved welding structure between a case and a cap plate.

A rechargeable battery including an electrode assembly having a positive electrode and a negative electrode and a separator interposed between the positive electrode and the negative electrode, a case for housing the electrode assembly, the case having an open end for receiving the electrode assembly into the case, the open end being formed by a case wall having a wall end surface, and a cap plate for closing the open end. The cap plate has an inclined outer edge surface, an outer end of the inclined outer edge surface being attached to the wall end surface. The wall end surface has a wall inner edge and a wall outer edge. The outer end may be placed between the wall inner edge and the wall outer edge.

The outer end may be attached on the surface of the opened end of the case by welding that is performed in a direction perpendicular to the surface of the opened end. The welding may be performed by emitting laser beams. The laser beams are emitted in a direction perpendicular to the surface of the opened end of the case.

An opposite surface of the cap plate to the inclined edge surface may contact the surface of the opened end of the case.

The rechargeable battery may be used as a power source for driving a motor.

According to another aspect of the present invention, there is provided a method of manufacturing a rechargeable battery comprising an electrode assembly, a case for receiving the electrode assembly, the case having at least one opened end, and a cap plate coupled to the opened end of the case, the method includes disposing the electrode in the case through the opened end, placing an outer edge end of the cap plate on a surface of the opened end of the case; and coupling the outer edge end of the cap plate to the surface of the opened end of the case using welding.

An angle between the inclined edge surface and a bottom surface of the cap plate may be within a range of 0-90°.

DETAILED DESCRIPTION

Figure 1:
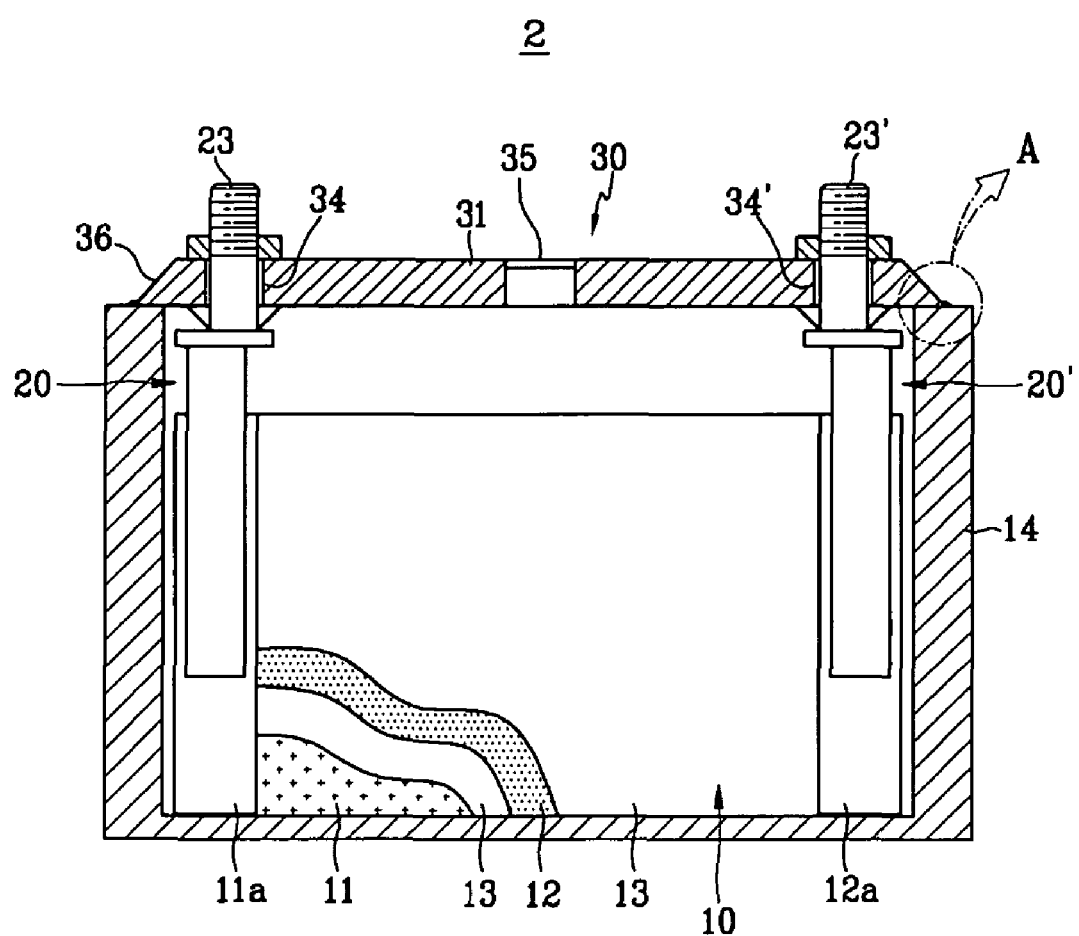
FIG. 1 is a partial sectional view of a rechargeable battery according to an exemplary embodiment of the present invention.

Referring first to FIG. 1, a rechargeable battery 2 includes an electrode assembly 10 having positive and negative electrodes 11, 12 and a separator 13 interposed between the positive and negative electrodes 11, 12, a case 14 for receiving the electrode assembly 10, and a cap assembly 30 sealed to the case 14 by welding. The cap assembly 30 includes external terminals 23, 23' extending from an interior to an exterior of the case 14. The external terminals 23, 23' are electrically connected to taps 20, 20', the taps being connected to non-coated regions 11a, 12a of the respective positive and negative electrodes 11, 12.

The case 14 may be formed of a conductive material such as aluminum, an aluminum alloy, or steel coated with nickel. In this embodiment, the case 14 has a rectangular cross section. However, such a structure of the case 14 is merely exemplary and the present invention is not limited thereto.

The cap assembly 30 includes a cap plate 31 coupled to an opening of the case 14 to tightly seal the case 14. The cap plate 31 is provided with terminal holes 34, 34' through which the external terminals 23, 23' protrude, respectively. A vent 35 is formed on the cap plate 31 to release gas from the case 14 when internal pressure of the case 14 increases above a predetermined level.

In this embodiment, the non-coated regions 11a, 12a electrically connected to the respective taps 20, 20' are formed on side end portions of the respective positive and negative electrodes 11, 12. However, the present invention is not limited to this case.

Each of the positive and negative electrodes 11, 12 between which the separator 13 is interposed includes a collector and an active material layer coated on the collector. The electrode assembly 10 is received in the case 14 such that the non-coated regions 11a, 12a are located adjacent to the walls of the case 14. The external terminals 23, 23' of the cap assembly 30 are electrically connected to the positive and negative electrodes 11, 12 via the taps 20, 20'.

In this embodiment, an outer edge of the cap plate 31 placed on the top surface of the case 14 is formed as an inclined edge surface 36. The cap plate 31 is placed on the top surface of the case 14 such that a base surface of the cap plate located opposite to the inclined edge surface 36 contacts the top surface of the case 14.

Figure 2:
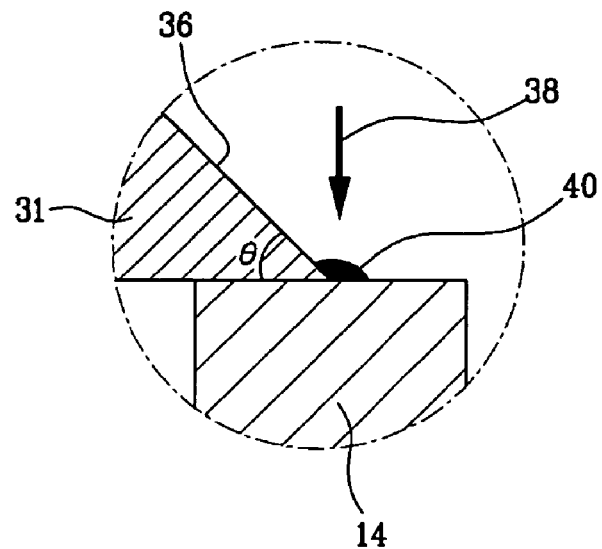
FIG. 2 is an enlarged view of portion A of FIG. 1.

The inclined edge surface 36 is formed along the overall edge of the cap plate 31. As also shown in more detail in FIG. 2, an angle θ between the inclined edge surface 36 and the bottom surface of the cap plate 31 may be set within the following range.

$$0 < \theta < 90°$$

The inclined edge surface 36 of the cap plate 31 is inclined toward the top surface of the case 14 such that an outer end of the inclined edge surface 36 is substantially centrally disposed on the battery case 14. In other words, the distance between an end of the inclined edge surface 36 and an exterior edge of the case 14 is substantially equal around the circumference of the battery. Since the outer end of the inclined edge surface 36 is thinner than the rest of the cap plate 31, welding the cap plate to the case at the outer end improves a weld 40.

The cap plate 31 may be coupled to the case 14 by vertically laser-welding 38 the outer end of the inclined edge surface 36 on the top surface of the case 14. That is, since the cap plate 31 is placed on the top surface of the case 14 erected vertically, the laser-welding 38 is performed in a vertical perpendicular direction toward the center of the top surface of the case 14. Therefore, the laser beams emitted during the laser-welding cannot reach the electrode assembly, thereby preventing the electrode assembly from being damaged.

Figure 3:
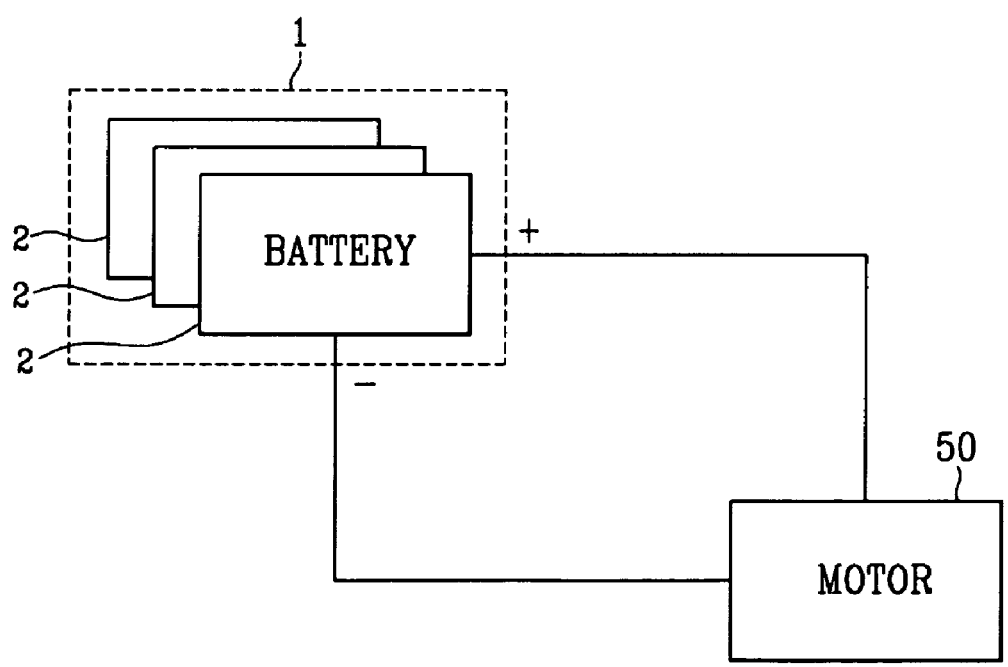
FIG. 3 is a block diagram showing the rechargeable battery of FIG. 1 used to drive a motor.

FIG. 3 shows an example where the rechargeable battery according to the embodiment of FIG. 1 is used as a unit battery of a battery module used as a power source for driving a motor. A battery module 1 has a plurality of unit batteries 2 and is adapted to drive a motor 50.

According to the present invention, the taps of rechargeable batteries, may be effectively protected from laser beams. The rechargeable battery of the present invention may be used as a power source for driving motors, such as those for electric vehicles, electric scooters, electric bicycles, wireless vacuum cleaners, or the like.

According to the present invention, since the welding property of the cap plate on the case is improved, the airtightness and reliability of the rechargeable batteries may be improved. Furthermore, damage to the electrode assembly, caused by laser beams used for laser-welding can be prevented.

While the invention has been described in connection with certain exemplary embodiments, it will be understood by those skilled in the art that the invention is not limited to the disclosed embodiment, but rather is intended to cover various modifications included with the sprit and scope of appended claims and equivalents thereof.

What is claimed is:

1. A rechargeable battery comprising:
    an electrode assembly comprising a positive electrode, a negative electrode, and a separator between the positive electrode and the negative electrode;
    a case housing the electrode assembly and having an open end for receiving the electrode assembly into the case, the case comprising a case wall having a wall end surface at the open end; and
    a cap plate closing the open end and comprising a base surface parallel to and contacting the wall end surface, an outside surface located outside the case and opposite the base surface, and an inclined outer edge surface having an outer end attached to the wall end surface, the inclined outer edge surface being inclined outwardly and extending from the outside surface to the base surface,
    wherein the cap plate is welded at the outer end to the wall end surface and seals the case at the outer end,
    wherein the outer end is spaced apart from a wall outer edge of the wall end surface around a circumference of the rechargeable battery, and
    wherein an angle between the inclined outer edge surface and the base surface is greater than 0° and less than 90°.

2. The rechargeable battery of claim 1, wherein:
    the wall end surface has a wall inner edge, and
    the outer end is located between the wall inner edge and the wall outer edge.

3. The rechargeable battery of claim 2, wherein the outer end is centrally located between the wall inner edge and the wall outer edge.

4. The rechargeable battery of claim 1, wherein the cap plate is laser-welded at the outer end to the wall end surface.

5. The rechargeable battery of claim 4, wherein the laser welding is directed perpendicularly to the wall end surface.

6. The rechargeable battery of claim 1, wherein the rechargeable battery is adapted to drive a motor together with at least one another rechargeable battery.

7. A rechargeable battery comprising:
    an electrode assembly comprising a positive electrode, a negative electrode, and a separator between the positive electrode and the negative electrode;
    a case containing the electrode assembly and having an open end for receiving the electrode assembly into the case, the case comprising a case wall having a wall end surface at the open end; and
    a cap plate closing the open end and comprising a base surface parallel to and contacting the wall end surface, an outside surface located outside the case and opposite the base surface, and an inclined outer edge surface having an outer end attached to the wall end surface, the inclined outer edge surface being inclined outwardly and extending from the outside surface to the base surface,
    wherein the base surface is planar and covers an entire side of the cap plate, and a thickness of the cap plate at the outer end is less than a thickness of the cap plate at a location other than the outer end, and
    wherein the outer end is spaced apart from an exterior edge of the wall end surface around a circumference of the rechargeable battery.

* * * * *